US007659895B2

(12) United States Patent
Kandogan

(10) Patent No.: US 7,659,895 B2
(45) Date of Patent: Feb. 9, 2010

(54) MULTIDIMENSIONAL VISUALIZATION METHOD

(75) Inventor: Eser Kandogan, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 2053 days.

(21) Appl. No.: 09/860,968

(22) Filed: May 18, 2001

(65) Prior Publication Data

US 2002/0171646 A1 Nov. 21, 2002

(51) Int. Cl.
*G06T 11/20* (2006.01)
*G09G 5/22* (2006.01)
*G06F 7/00* (2006.01)

(52) U.S. Cl. ............... 345/440; 345/440.1; 345/440.2; 345/441; 707/6

(58) Field of Classification Search ............. 345/440, 345/440.1, 440.2, 441; 707/6
See application file for complete search history.

(56) References Cited

U.S. PATENT DOCUMENTS

| 4,675,147 | A | | 6/1987 | Schaefer et al. ............. 376/245 |
|---|---|---|---|---|
| 5,408,596 | A | | 4/1995 | Nonaka et al. .............. 395/140 |
| 5,546,516 | A | | 8/1996 | Austel et al. ................ 395/140 |
| 5,917,500 | A | * | 6/1999 | Johnson et al. ............. 345/440 |
| 5,933,818 | A | | 8/1999 | Kasravi et al. .............. 706/12 |
| 5,986,673 | A | | 11/1999 | Martz ........................ 345/437 |
| 6,064,770 | A | | 5/2000 | Scarth et al. ................ 382/225 |
| 6,100,901 | A | * | 8/2000 | Mohda et al. ............... 345/440 |
| 6,169,534 | B1 | | 1/2001 | Raffel et al. ................ 345/133 |
| 6,211,887 | B1 | | 4/2001 | Meier et al. ................. 345/440 |
| 6,362,823 | B1 | * | 3/2002 | Johnson et al. ............. 345/440 |
| 6,477,538 | B2 | * | 11/2002 | Yaginuma et al. ........... 707/102 |

OTHER PUBLICATIONS

R. R. Johnson, "Visualization of Multi-Dimensional Data with Vector-fusion", Proc. of IEEE Visualization '00, pp. 297-302, 2000.*
Dianne Cook, et al., "Grand Tour and Projection Pursuit", Journal of Computational and Grahphical Statistics, vol. 4, No. 3, pp. 155-172.*
M. Ankerst, et al., "Circle Segments: A Technique for Visually Exploring Large Multidimensional Data Sets", Proc. Visualization '96, Hot Topic Session, San Francisco, CA 1996.*
D. Keim, "Pixel-oriented Database Visualizations", SIGMOD Record, vol. 25, No. 4, Dec. 1996, pp. 35-39.*
H. Theisel and M. Kreuseler, "An Enhanced Spring Model for Information Visualization", Computer Graphics Forum, Proceedings Eurographics 1998, vol. 17, No. 3, 1998.*

(Continued)

*Primary Examiner*—Jin-Cheng Wang
(74) *Attorney, Agent, or Firm*—Daniel E. Johnson

(57) ABSTRACT

Multi-dimensional objects or data may be represented in two dimensions, thereby facilitating understanding of the information or data. This reduction in the number of dimensions is accomplished by constructing unit vectors corresponding to the dimensions, in which the unit vectors share a common plane. Information objects or multi-dimensional data are plotted and represented as small features such as points on a display tied to a processor or computer. A user may gain insight into how the information is structured by performing certain transformations on it, such as scaling one (or more) unit vectors or rotating one or more unit vectors, followed by replotting the points.

33 Claims, 9 Drawing Sheets

OTHER PUBLICATIONS

M. Kreuseler, H. Schumann, "Information visualization using a new focus+context technique in combination with dynamic clustering of information space", Proceedings of the 1999 workshop on NPIVM, Nov. 1999, p. 1-5.*

A. Iselberg et al., *Parallel Coordinates: A Tool for Visualizing Multi-Dimensional Geometry*, Proceedings of the First IEEE Conference on Visualization, 1990, pp. 361-378.

K. Andrews et al., *Star Coordinates: A Multi-dimensional Visualization Technique with Uniform Treatment of Dimensions*, Late Breaking Hot Topics Proceedings & the Final Program, IEEE Information Visualization Symposium 2000, Oct. 9-10, 2000, Salt Lake City, UT, pp. 9-12.

C. Brunsdon et al., *An Investigation of Methods for Visualising Highly Multivariate Datasets*.

J. Friedman et al., *A Projection Pursuit Algorithm for Exploratory Data Analysis*, IEEE Transactions on Computers, vol. c-23, No. 9, Sep. 1974, pp. 881-890.

J. Friedman et al., *An Introduction to Real Time Graphical Techniques for Analyzing Multivariate Data*, SLAC—PUB—4254, Mar. 1987, M, pp. 1-15.

*Terminal for Real-Time Viewing of Multidimensional Data*, IBM Technical Disclosure Bulletin, vol. 33, No. 3A, Aug. 1990, pp. 202-204.

M. Ankerst et al., *Circle Segments: A Technique for Visually Exploring Large Multidimensional Data Sets*, Proc. Visualization '96, Hot Topic Session, San Francisco, California, 1996.

C. Stolte et al., *Polaris: A System for Query, Analysis and Visualization of Multi-Dimensional Relational Databases*, IEEE Xplore Abstract/Citation, Information Visualization, 2000, InfoVis 2000, IEEE Symposium, pp. 5-14.

*Many-Dimensional Visualization Technique*, IBM Technical Disclosure Bulletin, vol. 35, No. 6, Nov. 1992, pp. 473-475.

J. Kruskal, *Toward a Practical Method Which Helps Uncover the Structure of a Set of Multivariate Observations by Finding the Linear Transformation Which Optimizes a New "Index of Condensation,"* Bell Telephone Laboratories, Incorporated Murray Hill, New Jersey, pp. 426-441.

H. Chernoff, *The Use of Faces to Represent Points in k-Dimensional Space Graphically*, Journal of the American Statistical Association, Jun. 1973, vol. 68, No. 342, Theory and Methods Section, pp. 361-368.

J. Bertin, *Graphics and Graphic Information Processing*, Walter de Gruyer & Co., Berlin, pp. 24-31, 1981.

Dianne Cook, Andreas Buja: "Manual Controls for High-Dimensional Data Projections", Journal of Computational and Graphical Statistics, vol. 6 (4), 1997, pp. 1-19.

E. Kandogan, *Star Coordinates: A Multi-dimensional Visualization Technique with Uniform Treatment of Dimensions*, IEEE Symposium on Information Visualization 2000, Oct. 9, 2000, pp. 9-12.

* cited by examiner

|   | $F_1$ | $F_2$ | $F_3$ | $F_4$ | $F_5$ | $F_6$ | $F_7$ | $F_8$ |
|---|---|---|---|---|---|---|---|---|
| $P_1$ | $d_{11}$ | $d_{12}$ | $d_{13}$ | $d_{14}$ | $d_{15}$ | $d_{16}$ | $d_{17}$ | $d_{18}$ |
| $P_2$ | $d_{21}$ | $d_{22}$ | ⋅⋅ | | | | | |
| ⋮ | ⋮ | ⋮ | ⋮ | ⋮ | ⋮ | ⋮ | ⋮ | ⋮ |
| $P_n$ | $d_{n1}$ | $d_{n2}$ | | | | | | $d_{n8}$ |

MULTIDIMENSIONAL VISUALIZATION METHOD

TECHNICAL FIELD

The invention is in the field of information management. More particularly, the invention relates to the ability to understand and gain insight from multi-dimensional data.

BACKGROUND

Scientific, engineering, and business data (or more generally, information) are often multi-dimensional, i.e., they depend on several variables. Information presented in matrix form, in which typically the rows correspond to the "data points" and the columns correspond to the variables, may contain more than three columns of information. Representing and making sense of such multi-dimensional information is challenging, at least in part because of three-dimensional space in which we live. For example, reducing a four dimensional data space to a two or even three dimensional representation necessarily involves introducing some ambiguities in how the data is presented: In a two-dimensional projection of a three-dimensional scatter plot, a point may correspond to any value parallel to the viewing axis. It has been a long standing goal of the information science community to relieve the dimensionality curse on knowledge discovery through simple information representations derived from familiar and easy to understand lower dimensional representations, and to do this in a way that does not sacrifice understanding of the information.

Visualization techniques are powerful information management tools that support knowledge workers in their decision-making activities by stimulating visual thinking. One of the goals of visualization techniques is to support knowledge workers in the early stages of their information-understanding tasks. The techniques generally involve some sort of graphical representation that facilitates qualitative rather than quantitative analysis. That is, the purpose of such techniques is generally to gain insight into the distribution of the information, such as exploring interesting trends and patterns or "structure" in the information. It is assumed that once the user has a better overall understanding of the information, he or she will be able to glean numerical details during later stages of the knowledge discovery process. Thus, it is expected that users of visualization techniques are likely to tolerate loss of exact information in the initial stages of their analysis by trading certainty for insight.

The use of simple visual representations, in which all dimensions are represented, may be crucial in the early stages of information analysis, as users are confronted with the need to explore and compare a number of different options rapidly. However, if the representations are too complex and involve too many visual cues such as color, size, direction, and position, the user may be overloaded, since the user does not yet have a good understanding of his or her information. In addition, the use of multiple encodings makes it difficult to compare trends and clusters and understand information distribution in higher dimensional spaces.

One such attempt to reduce multi-dimensional information to a more manageable two-dimensional presentation is Bertin's Permutation Matrices (see J. Bertin, *Graphics and Graphic Information Processing*, Walter de Gruyter & Co., Berlin, pp. 24-31, 1981), which allows users to rearrange rows and columns to discover patterns and clusters from coarse graphical depictions of information. In Permutation Matrices, data in each cell are represented using simple visuals such as black or white colored cells. Using this simple but coarse technique, it is possible to grasp the distribution of data and clusters without the need for exact data values. Users can tolerate loss of information for the sake of gaining insight into the data. The strength of the Permutation Matrices also lies in the interactivity that enables users to integrate and separate dimensions in the visual representation.

Another such technique is the use of so-called Parallel Coordinates (see A. Inselberg and B. Dimsdale, "Parallel coordinates: a tool for visualizing multi-dimensional geometry", Proceedings of the First IEEE Conference on Visualization, 1990), in which parallel lines are laid out, and each dimension is encoded uniformly through the same visual cue (i.e., position). In Parallel Coordinates each data element is represented as a line passing through a coordinate axis at the value of the element for that dimension. While Parallel Coordinates is a very powerful technique—especially for modeling relationships—its visualizations generally rely on user expertise and knowledge of mathematical methods. Other techniques include Chernoff's use of faces to represent multi-dimensional data (see H. Chernoff, "The use of faces to represent points in k-Dimensional space graphically", Journal of American Statistical Association, 68, pp. 361-368, 1973), and Friedman's real-time motion graphics that gives pictures that appear to be moving, three dimensional objects (see J. H. Friedman and J. W. Tukey, "A projection pursuit algorithm for exploratory data analysis", IEEE Transactions on Computers, vol. C-23, no. 9, pp. 881-890, 1974). In spite of the advantages offered by these techniques, there is a still a need, however, for an information management technique that is more user friendly by efficiently facilitating user interaction.

SUMMARY OF THE INVENTION

Preferred implementations of the invention permit a user to represent multi-dimensional information objects or data in two dimensions, thereby facilitating understanding of the information or data. This reduction in the number of dimensions is accomplished by constructing (preferably linear) unit vectors corresponding to the dimensions, in which the unit vectors (at least some of which are not orthogonal to each other) share a common plane. Information objects or multi-dimensional data are plotted and represented as small features such as points (or small circles, triangles, squares, etc.) on a display, such as a screen of a monitor tied to a processor or computer. A user may then gain insight into how the information is structured by performing certain transformations on it. This may include scaling one (or more) unit vectors or rotating one or more unit vectors, followed by replotting the points. The user may perform transformations to the points in an iterative and iteractive way to gain insight into the nature of any clusters or why certain points are outliers (i.e., isolated from other points). These interactive visualization techniques may serve to effectively distinguish between dimensions that were lost in making the reduction to two dimensions.

In one aspect of the invention, there is provided a processor-implemented method of analyzing information objects, in which the information objects have at least four unique fields in common, with each field of each information object having a respective value. The method includes defining unit vectors for each of the fields, in which the unit vectors lie in a common plane, and providing a graphical representation for each of the unit vectors on a monitor interfaced with a processor. For each information object, field vectors for each field in the information object are calculated, in which each of the field vectors has a magnitude determined by the field's value and an orientation determined by the field's unit vector. For each information object, the field vectors are summed to determine an information object vector, and a feature (e.g., a point) representing the end point of the corresponding information object vector is displayed on the monitor, so that a first plot of features is displayed on the monitor. At least one of the graphical representations is then changed using a graphical user interface (e.g., with a mouse), and the processor redefines the unit vector corresponding to the changed graphical representation in accordance with this changing of the graphical representation. The processor recalculates information object vectors in accordance with the redefined unit vector, and for each recalculated information object, a feature is displayed on the monitor representing the end point of the corresponding recalculated information object vector, thereby displaying a second plot of features on the monitor. In preferred implementations, the number of fields is at least 5, and can be 9 or more. In one preferred implementation, the graphical representation includes a line segment or an arrow. In a preferred implementation, the second plot is displayed while the first plot is not. Alternatively, the first and second plots may be displayed on the monitor simultaneously, while also displaying line segments on the monitor that connect the features of the first plot with the features of the second plot.

In a preferred implementation, the length of one or more of the graphical representations may be changed, in which the processor then changes the magnitude of the unit vector corresponding to the changed graphical representation, in accordance with the change in the length of the graphical representation. Also, the orientation of one or more graphical representations may be changed, in which the processor then changes the orientation of the unit vector corresponding to the changed graphical representation in accordance with the reorientation of the graphical representation. In addition, one or more graphical representations may be deselected, in which case the processor sets the unit vector corresponding to the deselected graphical representation to zero. In preferred implementations of the method, one or more of the graphical representations may be changed iteratively to investigate the information objects. In a preferred implementation, at least one of the features has a glyph connected thereto, in which the glyph contains information related to at least one value in the fields.

In a preferred implementation, the method may further include examining the first plot to identify clusters of features or outliers. The method may also further include examining interrelationships between the features of the first plot and displaying the second plot to elucidate the interrelationships. The method may also include marking certain features in the first plot before displaying the second plot, and then displaying the second plot so that the second plot includes features having markings, in which the marked features in the second plot correspond to the marked features in the first plot. For at least one of the fields, a range of values may be selected, thereby marking features corresponding to the selected range. The method may also include selecting a first group of features, selecting a second group of features, performing a logical operation between the first and second group of features (thereby defining a third group of features), and displaying, on the monitor, the features in the third group as marked features.

In another aspect of the invention, there is provided a processor-implemented method of analyzing information, in which a set of information objects is provided that include fields (the information objects having at least four unique fields in common) and in which each field of each information object has a respective value. A unit vector is constructed for each field, in which the unit vectors have a plane in common. The unit vectors are represented graphically on a monitor as rays emanating from a common origin, in which the rays have respective magnitudes and orientations corresponding to the magnitudes and orientations of the unit vectors. For each information object, a vector summation over the fields in the information object is calculated, in which each field contributes to the vector summation an amount equal to the field's value times the field's unit vector. For each information object, the end point of the corresponding vector is displayed as a feature on the monitor, thereby displaying on the monitor a first set of features corresponding to the information objects. A graphical user interface (GUI) is used to reconstruct at least one of the rays, so that at least one of the reconstructed ray's magnitude and orientation is changed, and the processor is used to reconstruct the unit vector corresponding to the reconstructed ray in accordance with the change made to the reconstructed ray. For each information object, the processor is used to recalculate the vector summation with the reconstructed unit vector, and the end point of the corresponding recalculated vector summation is displayed as a feature on the monitor, thereby displaying on the monitor a second set of features corresponding to the information objects.

In another aspect of the invention, there is provided an information handling system that includes a processor, a monitor interfaced with the processor, and a graphical user interface (GUI) interfaced with the processor, in which the GUI interacts with a display on the monitor and the processor implements any one of the methods disclosed herein.

In other implementations, there are provided computer program products for carrying out any of the methods herein, e.g., computer program products comprising computer usable mediums.

BRIEF DESCRIPTION OF THE DRAWINGS

FIG. 7, which includes

DETAILED DESCRIPTION OF THE INVENTION

Figures 1, 2:
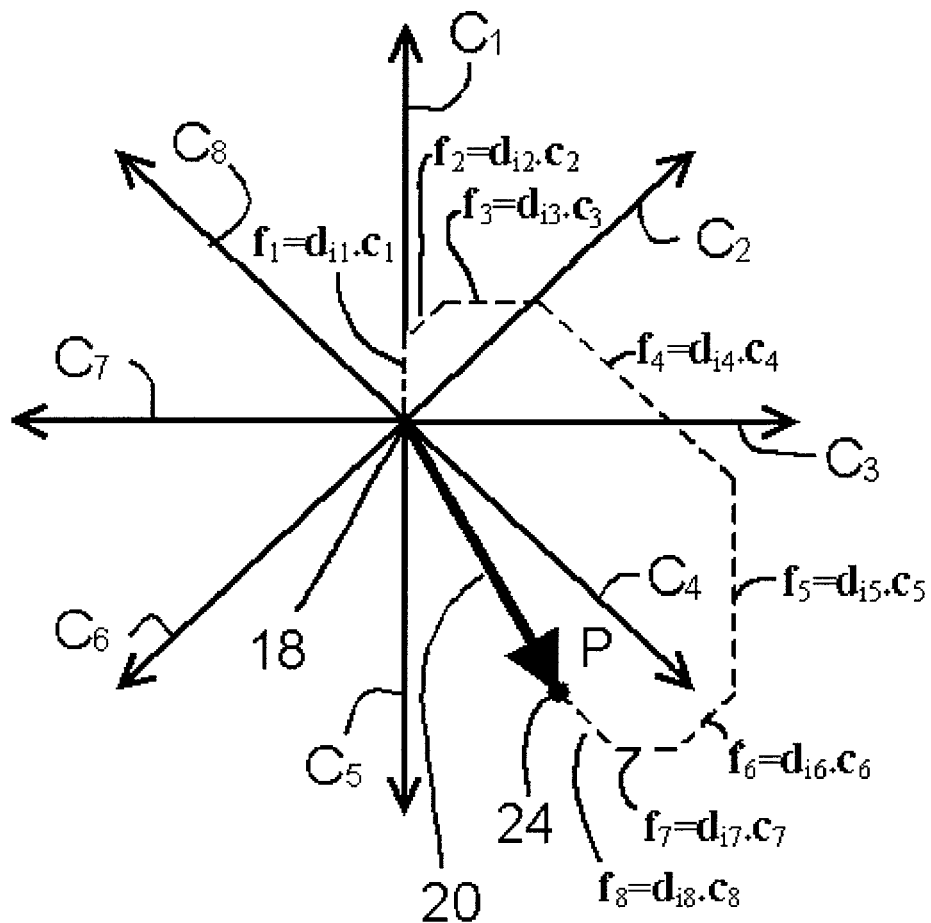
FIG. 1 shows a coordinate system used for representing multi-dimensional information objects or data in two dimensions.
FIG. 2 shows a matrix in which information objects are represented as rows of values, each value corresponding to a different column that represents a different field or dimension of the information objects.

Preferred implementations of the invention provide the user with the ability to rapidly gain insight into multi-dimensional information sets (e.g., data sets) by reducing the information to a two-dimensional representation. To this end, multi-dimensional information is represented in two-dimensional space through the use of a coordinate system dubbed herein as "Star Coordinates." One preferred Star Coordinate system is illustrated in FIG. 1. In this example, eight coordinate axes represented by arrows or rays $C_1, C_2, C_3, C_4, C_5, C_6, C_7, C_8$ are shown in a two-dimensional space (a common plane). Each of the axes corresponds to a different variable or "dimension" of a multi-dimensional information object or data entry. Thus, the information to be reduced to the Star Coordinate system of FIG. 1 has 8 variables. The rays $C_1, \ldots C_8$ are shown in this example as defining equal angles between the rays, which is a preferred but not a required implementation (as discussed below).

In preferred Star Coordinates methods described herein, multi-dimensional data or information objects are analyzed and interpreted by reducing them to two dimensions. Although Star Coordinates may be used with data or information objects having 3 unique dimensions, their greatest utility is with data or information objects having 4 or more unique dimensions, where dimensional complexity does not so readily lend itself to a two-dimensional representation. For example, data or information objects having 5, 6, 7, 8, 9, or more unique dimensions can be used effectively with Star Coordinate methods described herein. Thus, at least some coordinate axes within a Star Coordinate system are necessarily non-orthogonal to each other. In a preferred implementation shown in FIG. 1, the axes $C_1, \ldots C_8$ share a common origin 18, which in the Cartesian Coordinate system may be conveniently denoted by (0,0). For each of the axes $C_1, \ldots C_8$, it is advantageous to define a corresponding two-dimensional unit vector $c_1, c_2 \ldots c_8$ (not shown for the sake of clarity) that has the same orientation as its respective axis.

Multidimensional information objects (or "data points") may be plotted onto a Star Coordinate system by first considering that such information objects can be represented in matrix form as entries along respective rows, in which the fields or columns correspond to different variables. One such matrix is shown in FIG. 2, in which the information objects $P_1, P_2, \ldots P_N$ each represent a set of 8 values, with each value being associated with a different one of the 8 fields $F_1, F_2, \ldots, F_8$. A "field vector" may be calculated for each value $d_{ij}$ by multiplying that value by its corresponding unit vector $c_j$. An "information object vector" may then be calculated for each information object by performing a vector summation of all the field vectors for that information object.

This procedure is shown schematically in FIG. 1, in which field vectors $f_1, \ldots, f_8$ of the $i^{th}$ information object are lined up head-to-tail, starting from the origin 18. The value $d_{i1}$ has been multiplied by its corresponding unit vector $c_1$ to yield the first field vector $f_1$ of this $i^{th}$ information object, which is shown in FIG. 1 as equal to $d_{i1} \times c_1$. The value $d_{i2}$ is in turn multiplied by the vector $c_2$, which has an orientation different from $c_1$, so that when this second field vector $f_2$ is added to the first field vector $f_1$, the resulting vector sum of these two field vectors is directed somewhat away from the axis $C_1$ (since $f_2$ is oriented in a direction along the axis $C_2$). In a like manner, all the field vectors for the $i^{th}$ information object are summed together vectorially to yield a vector 20 that terminates in a point 24. In general, an information object vector $I_i$ is given by $$I_i = \Sigma d_{ij} c_j \tag{1}$$

in which the summation is over all the fields (over 8 fields in the example of FIGS. 1 and 2). The other information object vectors in an information set (data set) may likewise be represented as points in the same plane to form a plot of the information objects. In a preferred implementation of the use of Star Coordinates, the $d_{ij}$ are adjusted before any vector summation so that the minimum value within each field $F_j$ is taken to be zero, and the maximum value within each field is set equal to some predetermined scaling factor (e.g., the $d_{ij}$ undergo a linear transformation carried out by a computer or processor). In this manner, the relative strength of the various fields can be equalized, or alternatively, some fields can be weighted more heavily than others. (Alternatively, such scaling factors may be thought of as being incorporated into the unit vectors $c_1, c_2, \ldots c_8$, in the event that the unit vectors are initially all of equal magnitude.)

Note that as a result of the non-orthogonality of the unit vectors $c_1, c_2, \ldots c_8$, a single point may in principle correspond to more than one possible information object. However, visualization operations are described herein that permit a user to resolve these ambiguities and gain insight into how the information objects are distributed. In particular, the emergence of outliers (points far removed from any others), clusters or patterns are helpful in this regard. As described below, these techniques include the use of single axis and multi-axis scaling and rotation operations, as well as the marking of points to see how the position of the marked points changes in response to the scaling and/or rotation operations.

Figure 3:
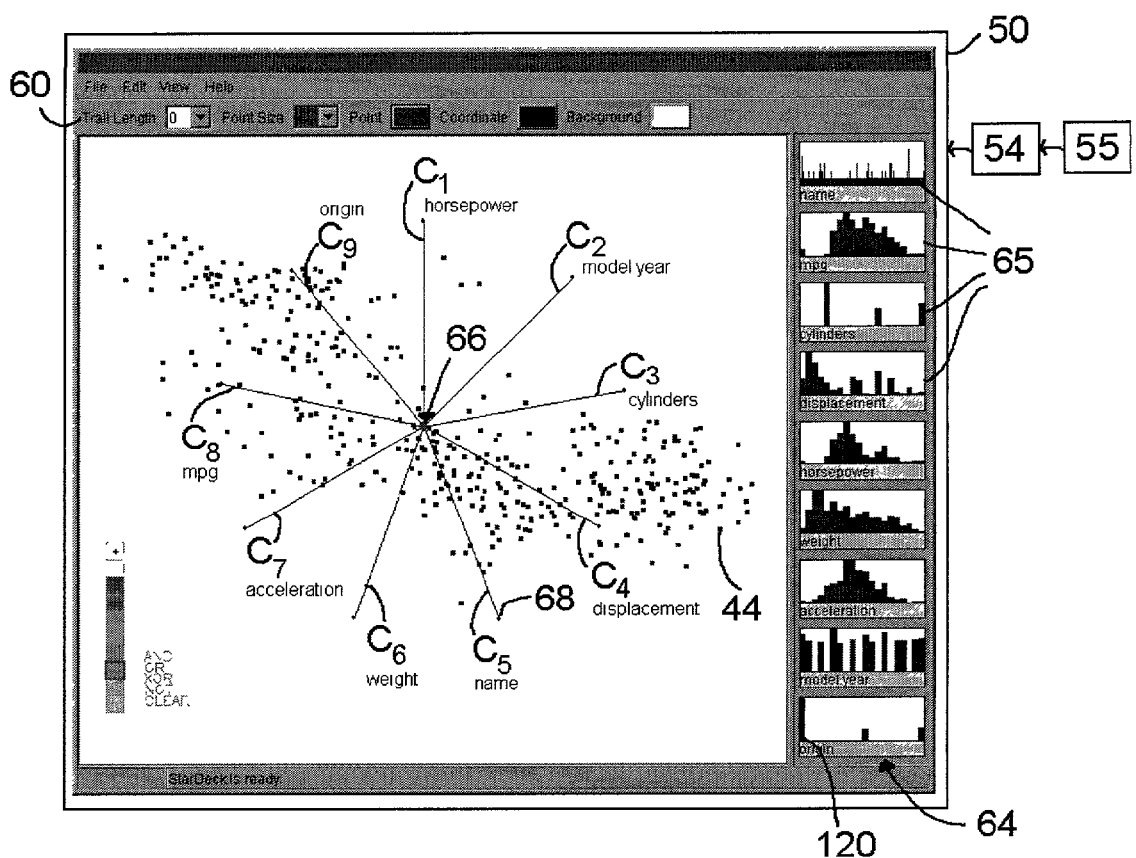
FIG. 3 shows how multi-dimensional information objects may be represented as a plot of points on a screen tied to a processor or computer.

With reference to FIG. 3, information objects are preferably plotted as points 44, or more generally as small features (such as small circles, squares, triangles, etc.), on a display or screen 50 of a monitor (e.g., a computer screen) that is electrically connected to a processor or computer 54. The monitor may be any kind of display, including a liquid crystal display, cathode ray tube, etc. (In the subsequent figures, only what is displayed on the screen 50 is shown.) The information objects may be uploaded onto the computer 54 (e.g., as a file) or entered directly by the user into the computer, which then plots the information objects on the screen 50 using a computer program written in accordance with the methodology described herein. To this end, the computer program may determine the unit vectors and plot the corresponding axes as well as the information objects. Alternatively, unit vectors may be constructed by the user in advance and uploaded with the information objects to be plotted.

FIG. 3 shows one implementation, in which 9 axes $C_1, C_2 \ldots, C_9$ are displayed as line segments (other graphical representations such as arrows may also be used) on the screen 50. In this example, the fields of the information objects correspond to the specifications of various makes of automobiles. Each point 44 represents a different make of automobile, with hundreds of such points being plotted on the screen 50. In particular, the axes $C_1, C_2 \ldots, C_9$ correspond respectively to horsepower, model year, number of cylinders, displacement, brand name (e.g., Honda, Chrysler, Ford, Jaguar), weight, acceleration, gas mileage in miles per gallon (mpg), and origin of the automobile (i.e., the continent in which it was manufactured: Europe, America, or Asia). If a field does not lend itself to a numerical representation, then numerical values may be assigned to the various possibilities within that field. In this example, the origin of the automobile is America, Asia, or Europe, and field values of 0, 1, and 2 have been assigned to these possibilities, respectively. Likewise, brand names may be assigned numerical values. For those fields lending themselves to quantitative representation, such as weight (pounds) or the gas mileage (mpg), the units are not of critical importance, since the unit vectors may be scaled to any desired length. FIG. 3 also includes a panel 60 dedicated to controlling various settings, such as size of the points 44 and selection of colors for the axes, the points, and the background of the screen 50. A second panel 64 includes several histograms 65, each one of which is dedicated to a different one of the fields. The histograms 65 in the histogram panel 64 suggest that the information objects include a number of clusters, which are likely to be revealed more clearly when the visualization operations described herein are applied. The use of histograms 65 is described in more detail below.

To facilitate understanding how the information objects are grouped into clusters, a scaling transformation may be performed on one of the unit vectors. This preferably involves the user selecting the endpoint of one of the axes $C_1, C_2, \ldots, C_9$ with a cursor tied to a mouse 55 or other graphical user interface and shortening (or lengthening) the axis by pushing (or pulling) the endpoint toward (or away from) the origin 66 common to the axes. The mouse 55 and GUI are preferably interfaced with the processor or computer 54. The computer recognizes this as a desire on the part of the user to shorten (or lengthen) the corresponding unit vector. This initiates a recalculation (redefinition) of the field vectors (for all the information objects) corresponding to the shortened (or lengthened) unit vector. Following this recalculation, the information objects are replotted, and the user may gain insight into how the information objects are distributed by examining the revised distribution of the information objects. By changing the length of one (or more) unit vectors, the relative contribution of a particular data field to the resulting plot of information objects can be varied, thereby making the scalar operation a powerful visualization technique for collapsing and expanding hierarchical clusters.

Figure 4:
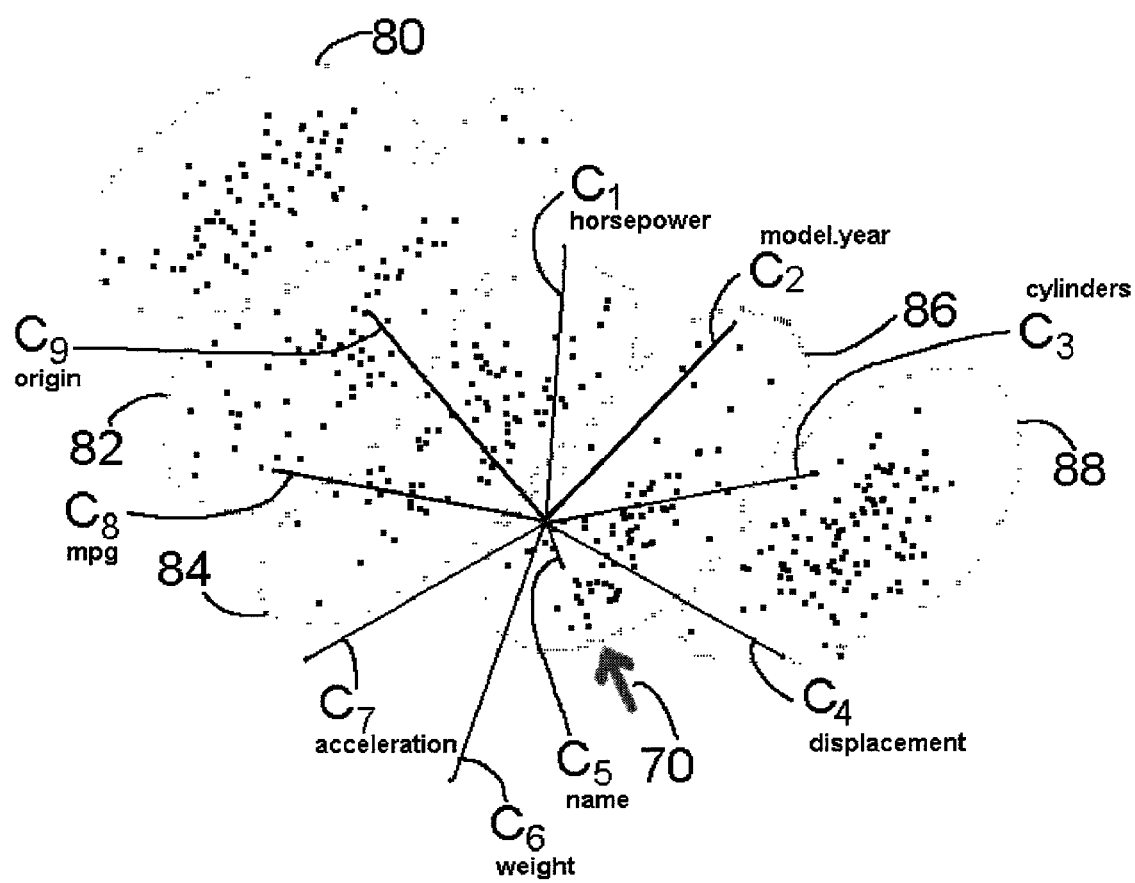
FIGS. 4 and 5 show how the plot of FIG. 3 can be transformed by performing sequential scaling operations to unit vectors.
Figure 5:
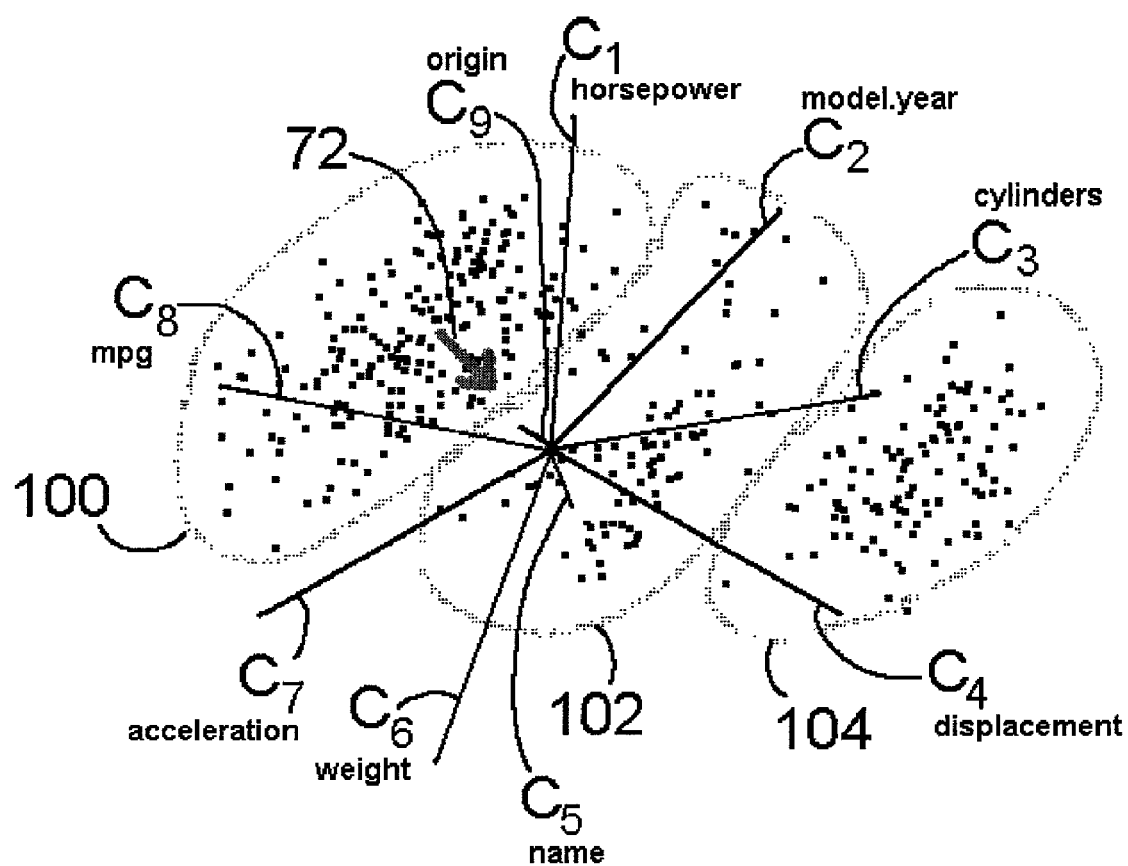

This technique is illustrated further with respect to FIGS. 4 and 5. In FIG. 4, the user has used a cursor tied to a mouse to select the endpoint 68 of the $C_5$ ("name") axis and moved this endpoint towards the origin 66, as indicated by the arrow 70. This has the effect of scaling down the unit vector corresponding to the $C_5$ axis, thereby reducing the extent to which the name field affects the distribution of the information objects as represented by the points 44. As a consequence of this scaling operation, five groups or clusters 80, 82, 84, 86, 88 are seen to merge in this new arrangement of the data points, in which car names have little effect on the distribution of the points.

FIG. 5 illustrates the effect of a scaling operation on the plot of information objects shown in FIG. 4. In FIG. 5, the user has shortened the length of the axis $C_9$ related to the field containing the information related to place of manufacture (Europe, America, or Asia), as suggested by the arrow 72. In so doing, the clusters 80, 82, and 84 appear to have collapsed into a single cluster 100, whereas two other clusters 102 and 104 appear to be substantially similar to the clusters 86 and 88, respectively. The information objects in FIG. 5 are distributed substantially on the basis of engine specifications, independent of the origin (continent) or name. Thus, the plot in FIG. 5 suggests that at least some cars from each of the three continents are represented in the cluster 100 (note that when the unit vector for the origin field was still substantially weighted as in FIG. 4 that the cluster 100 was divided into 3 groups), and that the automobiles in the cluster 100 have some similarities with respect to engine specifications. However, the continent that was assigned the smallest field value produces automobiles of varying specifications, as evidenced by the clusters 102 and 104. Indeed, in this example, the clusters 84, 86, and 88 represent automobiles manufactured in America, whereas the clusters 80 and 82 represent automobiles manufactured in Asia and Europe, respectively.

Scaling operations are advantageously performed such that the points 44 corresponding to the information objects are remapped in accordance with the revised length of the affected axis. Scaling operations may also be applied to multiple selected axes, either to several axes at once (before the points are replotted) or iteratively (in which the points are replotted after each iteration), to examine the combined effects of multiple fields and the correlations among the selected fields. Alternatively, one or more unit vectors may be set to 0 by "clicking off" their corresponding axes (e.g., by placing a cursor tied to a mouse over the axes to be deselected and double clicking with the mouse), thereby turning off the contribution from those corresponding fields.

Figure 6:
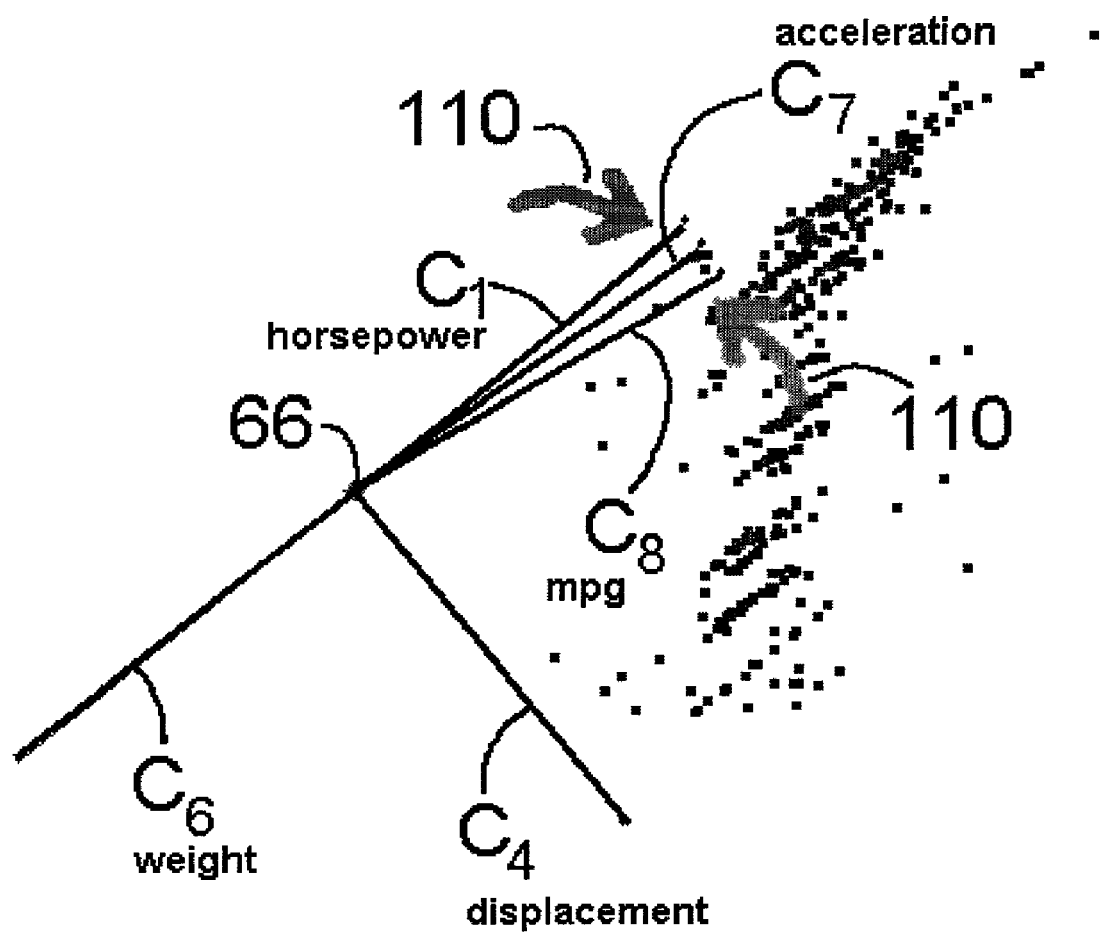
FIG. 6 shows how a plot of information objects represented as points can be transformed by performing a rotation operation to unit vectors.

Another operation that may be performed on the plotted information objects is a rotation transformation. As suggested by the arrows 110 in FIG. 6, a rotation operation changes the direction of a unit vector, thus making a particular field more or less correlated with the other fields. In a preferred implementation, the user rotates a unit vector by selecting any point along the corresponding axis (e.g., by placing a cursor tied to a mouse over the selected axis and clicking with the left button of a mouse) and then rotating the axis (while keeping the left button depressed) in a new direction (and then releasing the left button). A rotation by itself changes (redefines) only the direction of the affected unit vector. However, both rotation and scaling operations can be applied on one or more selected axes, either simultaneously (before replotting) or iteratively (replotting after each iteration), to examine the combined effects of multiple fields on the plots. A rotation operation may help considerably in resolving ambiguities that may be apparent in a given plot. For example, performing a rotation allows the user to separate overlapping clusters that appear at first glance to represent only one cluster.

When multiple unit vectors are oriented in the same or a similar direction, the contribution of their corresponding field vectors are effectively aggregated (resulting in a tendency for the plotted information objects to cluster), whereas when two unit vectors are oriented opposite each other, their respective field vectors tend to cancel each other. By using one or more rotation operations, a user can perform a multi-factor analysis, in which the unit vectors of fields representing desirable properties (e.g., horsepower, acceleration, and mpg) are aligned in the same or similar direction, and the unit vectors of fields representing undesirable properties (e.g., weight) are aligned opposite thereto. This has been done in FIG. 6, in which the displacement axis $C_4$ (and hence its corresponding unit vector) has been rotated so that it is perpendicular to the axes $C_1$, $C_7$, $C_8$, and $C_6$, representing the fields horsepower, acceleration, mpg, and weight, respectively. Note here that the axes $C_2$, $C_3$, and $C_5$ (and hence their corresponding unit vectors), corresponding to the fields model year, number of cylinders, and name, respectively, have been turned off. Using the plot in FIG. 6, the user can examine the tradeoff between weight on the one hand and horsepower, acceleration, and mpg, on the other, with respect to displacement.

In a preferred implementation, a user can use a mouse to mark particular points 44 either by selecting individual points (e.g., placing a cursor tied to the mouse and clicking on points individually) or by selecting all the points lying within an area (e.g., a rectangular area) defined by the mouse. The marked points may be "painted" with a certain color, thereby making it easier for the user to follow them throughout subsequent transformations, such as a scaling or rotation operation. When new clusters are observed after applying a number of transformations, having certain points pre-tagged in this fashion may help the user determine the nature or content of these clusters. To this end, when the user moves the cursor tied to the mouse (or other GUI) over a point 44, all the field values corresponding to that particular information object may be advantageously displayed in a pop-up box on the screen 50.

Figure 7A:
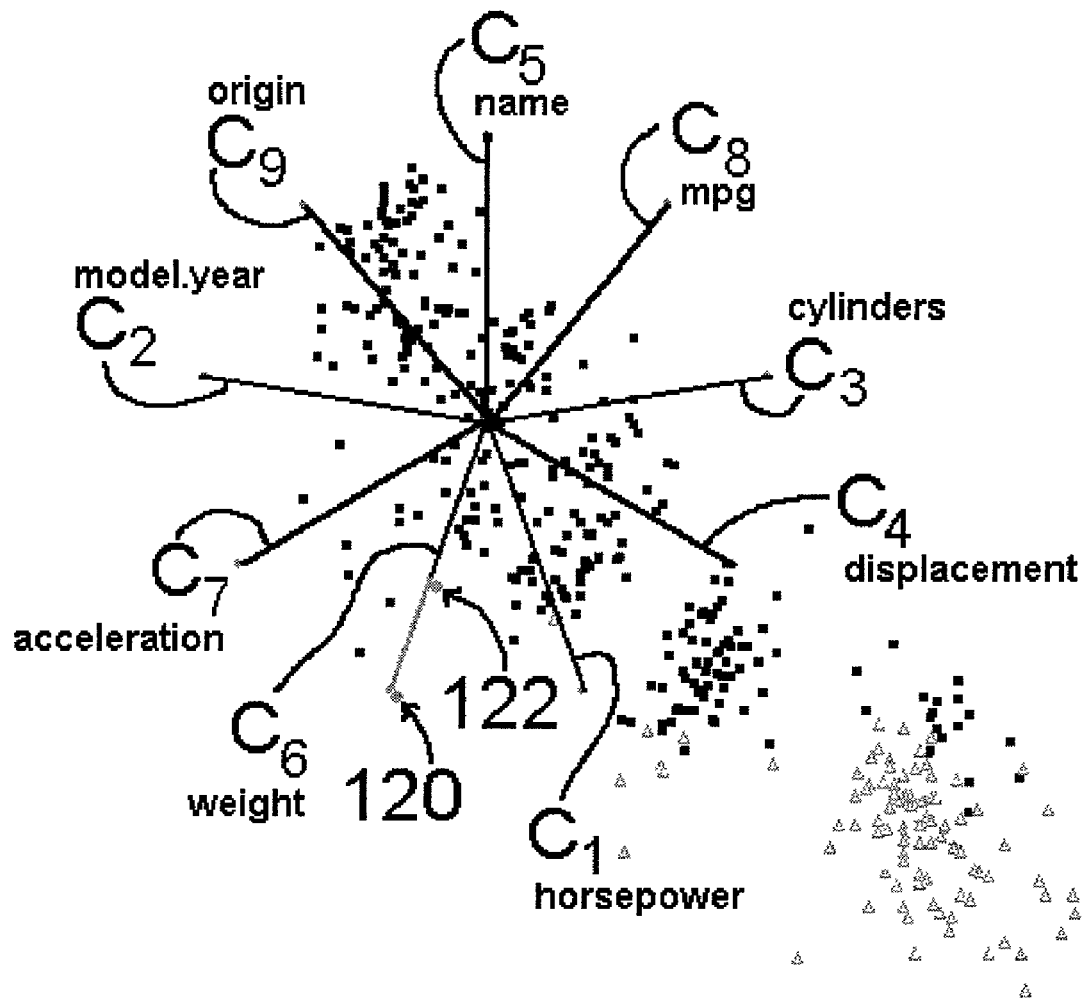
FIGS. 7A and 7B, illustrates how a particular range within a certain field (dimension) can be selected, thereby tagging points corresponding to the selected range.
Figure 7B:
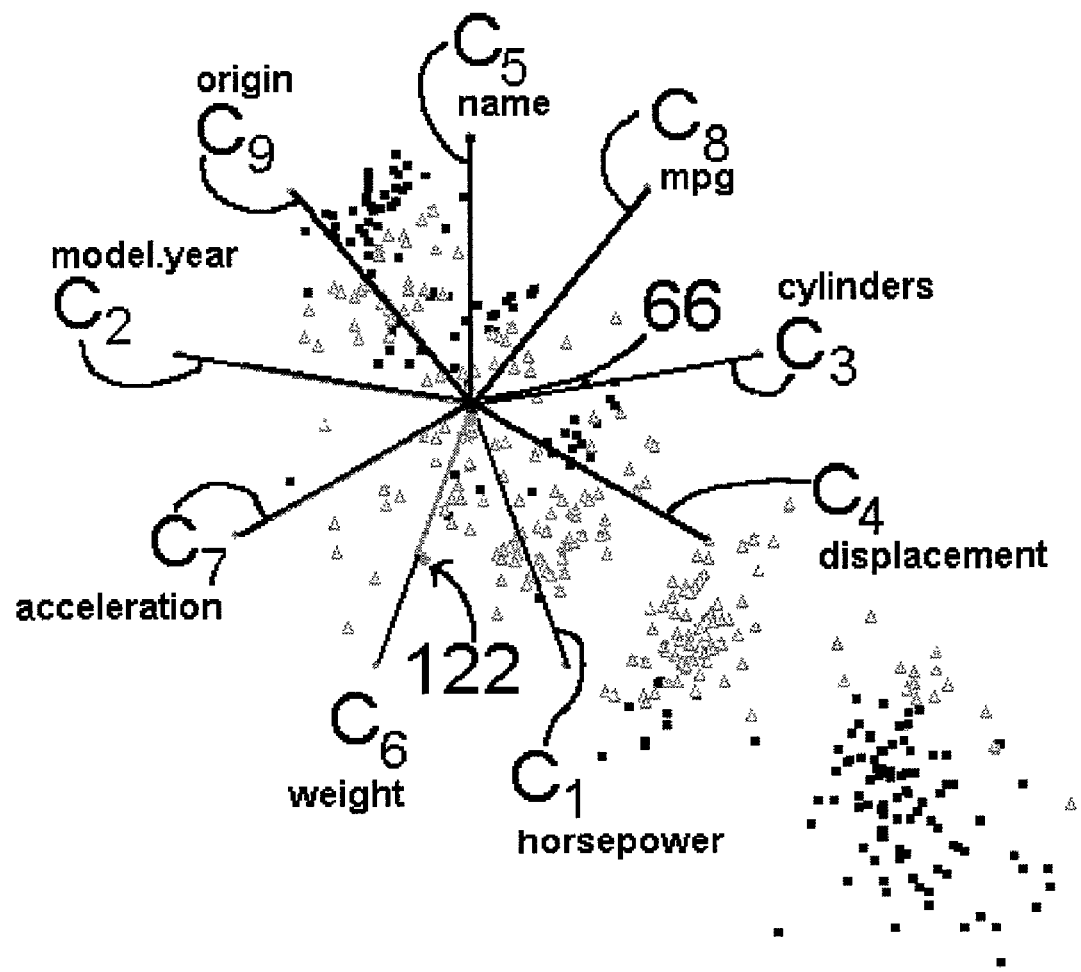

In another preferred implementation, a user can select a range of values for one or more fields by using a cursor tied to a mouse to mark the corresponding axes. For example, the axes to be marked may have appropriate hatchings (like a ruler) thereon. This has the effect of marking those points corresponding to the selected range (e.g., by tagging the points with a certain color), thereby permitting the user to understand how a particular range is distributed throughout a given plot. Once such a range is selected, the range can later be advantageously compressed, expanded, or otherwise changed. For example, in FIG. 7A the user makes an initial range selection on the weight axis $C_6$ by selecting that portion of the axis between the arrows 120 and 122. (For example, that portion of the $C_6$ axis lying between the arrows 120 and 122 may be highlighted in a color that matches the color to be used in tagging the points in question.) As a result of this range selection, the points corresponding to this range appear marked with a given color or may appear on the plot as a particular shape (e.g., as triangles, as in FIG. 7A). As the user varies the selected range, the points corresponding to this range vary as well, and the color (or shape) of the points in the plot may be advantageously updated in a continuous fashion to reflect the updated range query. Note that in FIG. 7B, a range corresponding to that portion of the $C_6$ axis between the arrow 122 and the origin 66 has been selected, and thus the points corresponding to this range are different from those corresponding to the range selected in FIG. 7A. This method allows the user to dynamically observe how points are distributed as the values of a particular field vary.

In one preferred implementation, ranges may be selected on more than one axis simultaneously. When ranges on multiple axes are selected, a user can choose to apply a logic operation such as AND, OR, NOT, or XOR between the selected sets. These logic operations become especially useful when slicing the information points using a specific query (e.g., mpg>30 AND horsepower>130). In another preferred implementation, a range on an axis (or ranges on multiple axes) may be selected thereby defining a first group of points, then a second group of points may be "tagged" (e.g., by defining a rectangle with a mouse, as described above), and then a logic operation between these two groups may be performed, thereby defining a third group of points that can then be displayed as marked points on the screen 50.

Histograms, like those shown in the histogram panel 64 of FIG. 3, can be useful when a group of interesting points is identified and the user is seeking to identify distinguishing features of this group of points. In one preferred implementation, a different color may be assigned to each one of several clusters, such as the clusters 80, 82, 84, 86, and 88 of FIG. 3. The histograms 65 may be constructed in color to reflect these different clusters or groupings as follows. Each bar 120 of the histogram 65 may include respective portions (not shown) dedicated to different colors, with the height of these portions within each bar being proportional to the number of points tagged with that same color. For example, if the points within the cluster 80 are tagged green, then portions of the bars 120 in the histograms 65 will also appear in green. This technique can be used to gain insight into the nature of the clusters 80, 82, 84, 86, and 88—how they are similar and how they differ from each other.

Figure 8:
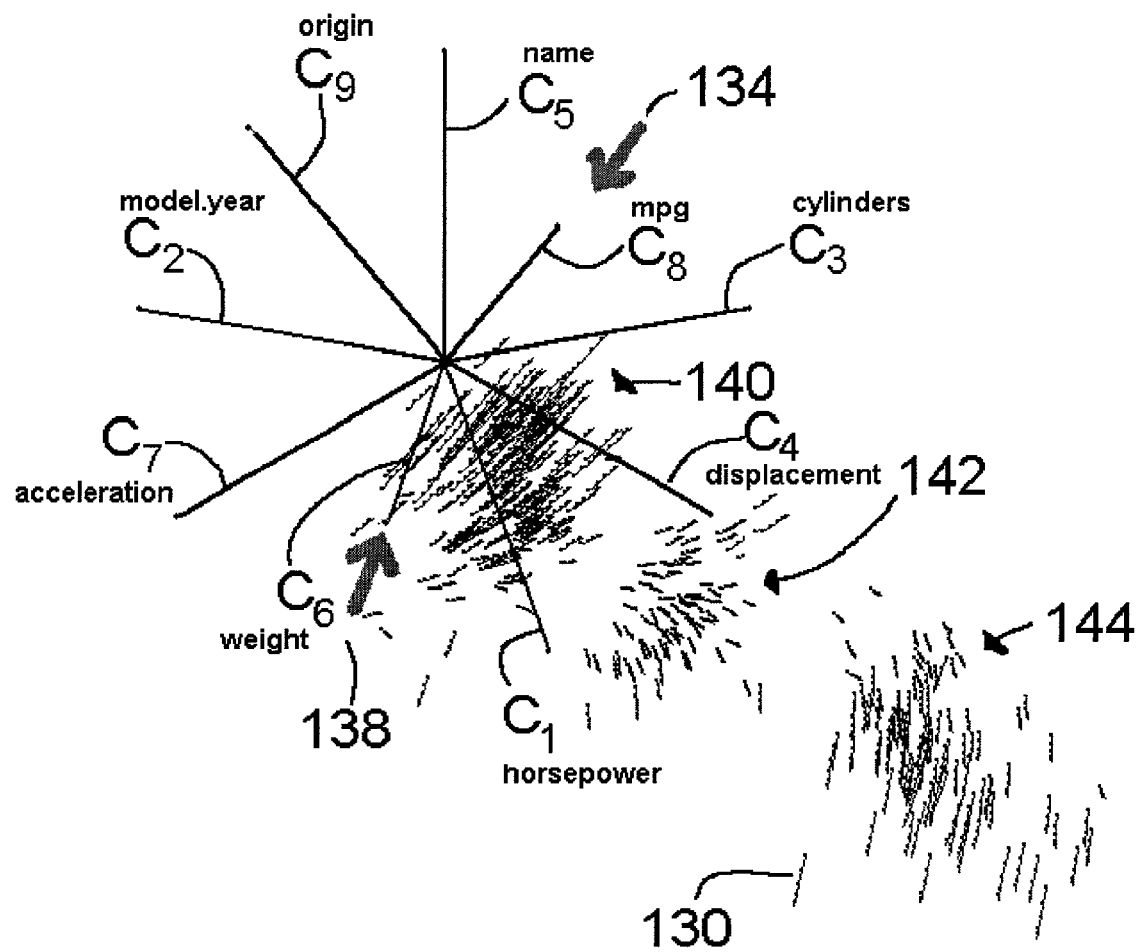
FIG. 8 shows how a first plot of information objects evolves into a second plot as a result of a transformation of the unit vectors (in this case, respective scaling operations on two different unit vectors).

When a user applies transformations such as a scaling or rotation operation, the transformations may be plotted statically or sequentially, i.e., when the second plot is displayed, the first plot no longer appears. Alternatively, transformations may be advantageously applied to the plot dynamically, so that the points 44 are replotted as the transformation is carried out. In this case, the user begins with a first plot of information objects (before any transformation is carried out), ends with a final plot of information objects (after the transformation has been performed), and visually experiences intermediate plots linking the two (while the transformation is being performed). However, it may advantageous to examine the "path" the points took in traveling from the first plot to the final plot. To this end, "footprints" can be used, in which marks connecting the data points of the first and final plots of data points are displayed. When used in conjunction with multi-dimensional scaling and rotation, footprints may help in determining correlations between different fields. By way of example, FIG. 8 shows footprints 130 as a result of scaling the unit vectors corresponding to the $C_8$ (mpg) and $C_6$ (weight) axes, as indicated by the arrows 134 and 138, respectively. The footprints 130 connect the initial and final plots of points. Note that three groups or clusters 140, 142, 144 are evident. The points in the cluster 140 have, by and large, moved along the $C_8$ axis (mpg) as a result of these two scaling operations. Thus, the points in the cluster 140 evidently represent automobiles having high mpg and low weight. On the other hand, most of the points in the cluster 144 are seen to have moved substantially parallel to the $C_6$ axis (weight), suggesting that the points in the cluster 144 correspond to rather heavy and low mpg automobiles. The points in the cluster 142 do not fall neatly into either of these possibilities.

Figure 9:
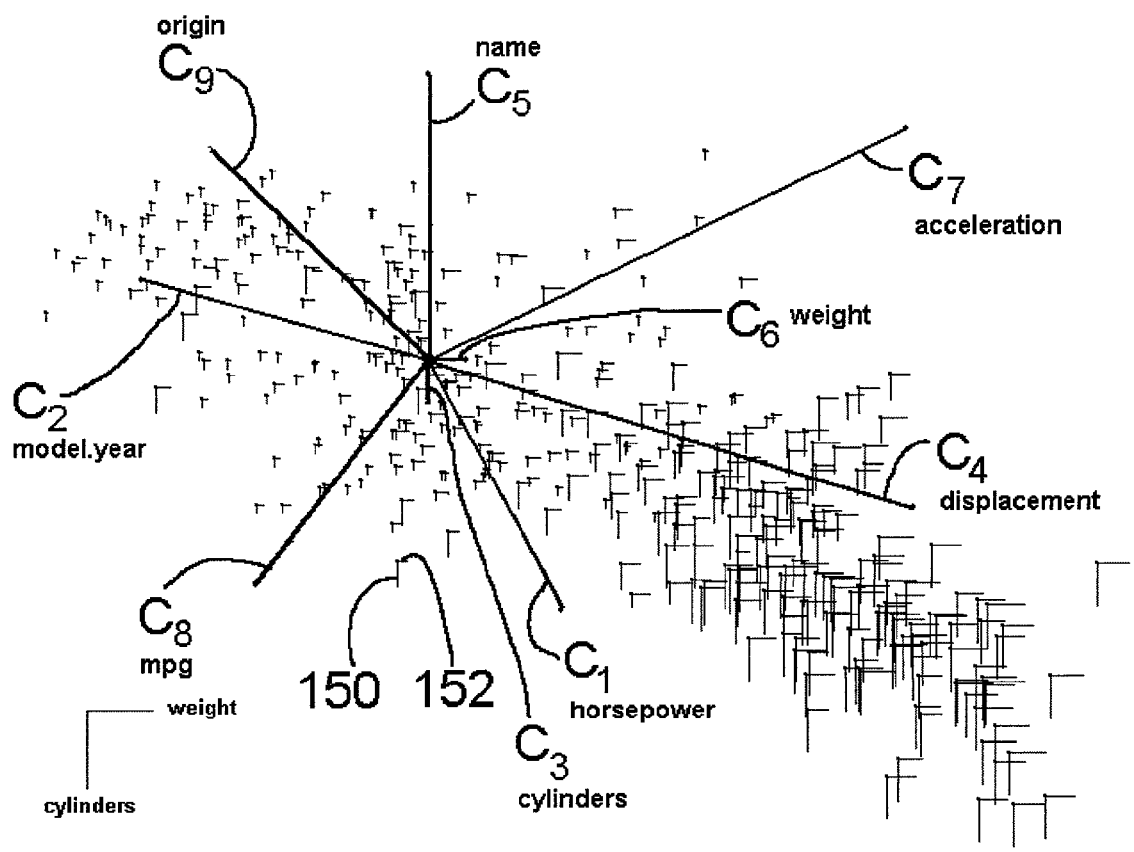
FIG. 9 shows how additional information may be included in two dimensional plots through the use of glyphs (such as line segments or "sticks") attached to the points, in which the vertical and horizontal line segments correspond to different fields (dimensions).

As discussed above, the plotting of information objects as points using the Star Coordinates representation can result in certain ambiguities since not all unit vectors are orthogonal. There are nevertheless occasions when associating the values in particular fields with the points is useful. One way to do this is by attaching glyphs to the points (or alternatively, replacing the points with glyphs), in which some characteristic feature of the glyph represents the value in a particular field. FIG. 9 shows one such implementation, in which vertically oriented sticks 150 and horizontally oriented sticks 152 are attached to the plotted points. The length of each stick 150 is proportional to the number of cylinders in that automobile represented by the point to which the stick is attached, whereas the length of each stick 152 is proportional to the weight of the automobile in question. This technique permits a user to consider additional dimensions simultaneously.

The methods described herein may be applied to any one of a number of multi-dimensional information sets, including those that might be used in a business setting, e.g., to determine why some customers remain loyal and some switch to other businesses. In a scientific setting, the methods herein may find application in understanding complicated multi-dimensional data sets, which do not otherwise lend themselves to simple representations (such as two-dimensional plots). Thus, the invention may be embodied in other specific forms without departing from its spirit or essential characteristics. The described implementations are to be considered in all respects only as illustrative and not restrictive. The scope of the invention is therefore indicated by the appended claims rather than the foregoing description. All changes within the meaning and range of equivalency of the claims are to be embraced within that scope.

In preferred embodiments of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

What is claimed is:

1. A processor-implemented method of analyzing information objects, the information objects having at least four unique fields in common, wherein each field of each information object has a respective value, comprising:

defining unit vectors for each of the fields, wherein the unit vectors lie in a common plane;

providing a graphical representation for each of the unit vectors on a monitor interfaced with a processor;

for each information object, calculating field vectors for each field in the information object, each of the field vectors having a magnitude determined by the field's value and an orientation determined by the field's unit vector;

for each information object, summing the field vectors to determine an information object vector;

for each information object, displaying on the monitor a feature representing the end point of the corresponding information object vector, thereby displaying a first plot of features on the monitor;

changing at least one of the graphical representations in response to a user using a graphical user interface (GUI);

using the processor to redefine the unit vector corresponding to the changed graphical representation in accordance with said changing;

using the processor to recalculate information object vectors in accordance with said redefinition of the unit vector; and for each recalculated information object, displaying on the monitor a feature representing the end point of the corresponding recalculated information object vector, thereby displaying a second plot of features on the monitor.

2. The method of claim 1, wherein the number of fields is at least 5.

3. The method of claim 1, wherein the number of fields is at least 9.

4. The method of claim 1, wherein the graphical representation includes a line segment or an arrow.

5. The method of claim 1, wherein the second plot is displayed while the first plot is not.

6. The method of claim 1, comprising:

displaying the first and second plots on the monitor simultaneously; and displaying line segments on the monitor that connect features of the first plot with features of the second plot.

7. The method of claim 1, said changing comprising changing the length of one of said graphical representations, the processor changing the magnitude of the unit vector corresponding to said one graphical representation in accordance with said change in the length of said one graphical representation.

8. The method of claim 1, said changing comprising changing the orientation of one of said graphical representations, the processor changing the orientation of the unit vector corresponding to said one graphical representation in accordance with said reorientation.

9. The method of claim 1, said changing comprising deselecting one of said graphical representations, the processor setting the unit vector corresponding to said deselected graphical representation to zero.

10. The method of claim 1, further comprising examining the first plot to identify clusters of features.

11. The method of claim 1, further comprising examining the first plot to identify outliers.

12. The method of claim 1, further comprising:

examining the first plot for interrelationships between the features of the first plot; and displaying the second plot to elucidate the interrelationships.

13. The method of claim 1, wherein the unit vectors are linear.

14. The method of claim 1, comprising:

marking certain features in the first plot before said displaying the second plot; and displaying the second plot so that the second plot includes features having markings, the marked features in the second plot corresponding to the marked features in the first plot.

15. The method of claim 1, comprising, for at least one of the fields, selecting a range of values, thereby marking features corresponding to the selected range.

16. The method of claim 1, wherein the GUI includes a mouse.

17. The method of claim 1, wherein at least one of the features has a glyph connected thereto, the glyph containing information related to at least one value in the fields.

18. The method of claim 1, further comprising:

selecting a first group of features;

selecting a second group of features;

performing a logical operation between the first and second group of features, thereby defining a third group of features; and displaying, on the monitor, the features in the third group as marked features.

19. The method of claim 1, wherein said changing at least one of the graphical representations is performed iteratively to investigate the information objects.

20. The method of claim 1, wherein features are displayed on the monitor as points.

21. The method of claim 1, further comprising displaying on the monitor a histogram of features.

22. The method of claim 21, wherein the histogram is constructed in color, and a different color is assigned to each one of different clusters of features.

23. A processor-implemented method of analyzing information, comprising:

providing a set of information objects that include fields, the information objects having at least four unique fields in common, in which each field of each information object has a respective value;

constructing a unit vector for each field, the unit vectors having a plane in common;

representing the unit vectors graphically on a monitor as rays emanating from a common origin, the rays having respective magnitudes and orientations corresponding to the magnitudes and orientations of the unit vectors;

for each information object, calculating a vector summation over the fields in the information object, in which each field contributes to the vector summation an amount equal to the field's value times the field's unit vector;

for each information object, displaying the end point of the corresponding vector summation as a feature on the monitor, thereby displaying on the monitor a first set of features corresponding to the information objects;

reconstructing at least one of the rays in response to a user using a graphical user interface (GUI), so that at least one of the reconstructed ray's magnitude and orientation is changed;

using the processor to reconstruct the unit vector corresponding to the reconstructed ray in accordance with the change made to the reconstructed ray;

for each information object, using the processor to recalculate the vector summation with the reconstructed unit vector; and for each information object, displaying the end point of the corresponding recalculated vector summation as a feature on the monitor, thereby displaying on the monitor a second set of features corresponding to the information objects.

24. The method of claim 23, wherein the number of fields is at least 5.

25. The method of claim 23, wherein the number of fields is at least 9.

26. The method of claim 23, wherein said reconstructing at least one of the rays is performed iteratively to investigate the information objects.

27. The method of claim 23, wherein features are displayed on the monitor as points.

28. A computer program product residing on a computer usable medium for carrying out the method of claim 1.

29. The method of claim 23, further comprising displaying on the monitor a histogram of features.

30. The method of claim 29, wherein the histogram is constructed in color, and a different color is assigned to each one of different clusters of features.

31. A computer program product residing on a computer usable medium for carrying out the method of claim 23.

32. An information handling system, comprising:
a processor;
a monitor interfaced with said processor; and
a graphical user interface (GUI) interfaced with said processor, said GUI interacting with a display on said monitor, wherein said processor implements the method of claim 1.

33. An information handling system, comprising:
a processor;
a monitor interfaced with said processor; and
a graphical user interface (GUI) interfaced with said processor, said GUI interacting with a display on said monitor, wherein said processor implements the method of claim 23.

* * * * *

UNITED STATES PATENT AND TRADEMARK OFFICE
CERTIFICATE OF CORRECTION

PATENT NO. : 7,659,895 B2 Page 1 of 1
APPLICATION NO. : 09/860968
DATED : February 9, 2010
INVENTOR(S) : Eser Kandogan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2592 days.

Signed and Sealed this

Twenty-eighth Day of December, 2010

David J. Kappos
*Director of the United States Patent and Trademark Office*